(12) United States Patent
Damnjanovic et al.

(10) Patent No.: US 11,696,172 B2
(45) Date of Patent: Jul. 4, 2023

(54) COVERAGE ENHANCEMENT FOR DUAL CONNECTIVITY

(71) Applicant: QUALCOMM Incorporated, San Diego, CA (US)

(72) Inventors: Jelena Damnjanovic, Del Mar, CA (US); Tao Luo, San Diego, CA (US); Juan Montojo, San Diego, CA (US); Kausik Ray Chaudhuri, San Diego, CA (US); Atanu Basudeb Halder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 17/179,309

(22) Filed: Feb. 18, 2021

(65) Prior Publication Data
US 2021/0258826 A1    Aug. 19, 2021

Related U.S. Application Data

(60) Provisional application No. 62/978,227, filed on Feb. 18, 2020.

(51) Int. Cl.
| | |
|---|---|
| *H04W 28/04* | (2009.01) |
| *H04L 1/20* | (2006.01) |
| *H04W 76/15* | (2018.01) |
| *H04W 72/21* | (2023.01) |
| *H04W 84/18* | (2009.01) |

(52) U.S. Cl.
CPC ............ *H04W 28/04* (2013.01); *H04L 1/20* (2013.01); *H04W 72/21* (2023.01); *H04W 76/15* (2018.02); *H04W 84/18* (2013.01)

(58) Field of Classification Search
CPC . H04W 28/04; H04W 76/15; H04W 72/0413; H04L 1/20
See application file for complete search history.

(56) References Cited

U.S. PATENT DOCUMENTS

| | | | | |
|---|---|---|---|---|
| 2019/0104560 A1* | 4/2019 | Nuggehalli | ....... | H04W 28/0808 |
| 2020/0329399 A1* | 10/2020 | Chung | ............ | H04W 80/02 |
| 2021/0314810 A1* | 10/2021 | Kanamarlapudi | .... | H04L 1/1848 |
| 2022/0322418 A1* | 10/2022 | Kim | .............. | H04L 1/0008 |

OTHER PUBLICATIONS

Dahlman et al "5G NR: The Next Generation Wireless Access Technology" Academic Press 2018 ISBN:978-0-12-814323-0 Chapter 3 (Year: 2018).*

* cited by examiner

*Primary Examiner* — Basil Ma
(74) *Attorney, Agent, or Firm* — Loza & Loza LLP

(57) ABSTRACT

In certain aspects, a method for wireless communication at a user equipment (UE) includes attempting to receive, from a first base station, data via a first communication link, generating a radio link control (RLC) status report indicating a status of the data at the UE, and transmitting, to a second base station, the RLC status report via a second communication link. The UE may be simultaneously connected to the first base station and the second base station using dual connectivity. In one example, the first base station may be configured as a secondary cell group (SCG) and the second base station may be configured as a master cell group (MCG). In one example, the first communication link may be a New Radio (NR) link and the second communication link may be a Long-Term Evolution (LTE) link.

34 Claims, 11 Drawing Sheets

COVERAGE ENHANCEMENT FOR DUAL CONNECTIVITY

RELATED APPLICATION

This application claims priority under 35 U.S.C. § 119(e) to U.S. Provisional Application No. 62/978,227 filed on Feb. 18, 2020, the entire specification of which is incorporated herein by reference.

BACKGROUND

Field

Aspects of the present disclosure relate generally to wireless communications, and more particularly, to coverage enhancement for dual connectivity.

Background

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include multiple base stations or network access nodes, each simultaneously supporting communication for multiple communication devices, which may be otherwise known as user equipment (UE).

A wireless communications system may implement a dual connectivity scheme, where a UE may be simultaneously connected to a first base station for LTE communications and to a second base station for NR communications. In dual connectivity, one of the base stations may be identified as a master cell group (MCG), which may also be referred to as a primary group cell (PCG). This base station may provide an anchor carrier for communications with the UE. The base station that is not identified as the MCG in a dual connectivity scheme may be identified as a secondary cell group (SCG). In some examples, the MCG is associated with LTE and controls an SCG associated with NR. In other examples, the MCG may be associated with NR, while the SCG is associated with LTE.

SUMMARY

The following presents a simplified summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

A first aspect relates to an apparatus for wireless communication. The apparatus includes a processor, a memory coupled with the processor, and instructions stored in the memory. The instructions are executable by the processor to cause the apparatus to attempt to receive, from a first base station, data via a first communication link, generate a radio link control (RLC) status report indicating a status of the data at the apparatus, and transmit, to a second base station, the RLC status report via a second communication link.

A second aspect relates to an apparatus for wireless communication. The apparatus includes a processor, a memory coupled with the processor, and instructions stored in the memory. The instructions are executable by the processor to cause the apparatus to receive, from a user equipment (UE), a radio link control (RLC) status report, wherein the RLC status report indicates a status of data transmitted by a base station to the UE via a first communication link, and the RLC status report is received via a second communication link. The instructions are also executable by the processor to cause the apparatus to forward, to the base station, the RLC status report via a backhaul link.

A third aspect relates to an apparatus for wireless communication. The apparatus includes a processor, a memory coupled with the processor, and instructions stored in the memory. The instructions are executable by the processor to cause the apparatus to transmit, to a user equipment (UE), data via a communication link, receive, from a base station, a radio link control (RLC) status report via a backhaul link, wherein the RLC status report indicates a status of the data at the UE, determine a portion of the data that was not successfully received by the UE based on the RLC status report, and retransmit, to the UE, the portion of the data via the communication link.

A fourth aspect relates to an apparatus for wireless communication. The apparatus includes a processor, a memory coupled with the processor, and instructions stored in the memory. The instructions are executable by the processor to cause the apparatus to attempt to receive, from a first base station, data via a first communication link, generate a radio link control (RLC) status report indicating a status of the data at the apparatus, determine a size of the RLC status report, compare the size of the RLC status report with a threshold, if the size of the RLC status report is greater than the threshold, then transmit, to a second base station, the RLC status report via a second communication link, and, if the size of the RLC status report is less than the threshold, then transmit, to the first base station, the RLC status report via the first communication link.

A fifth aspect relates to an apparatus for wireless communication. The apparatus includes a processor, a memory coupled with the processor, and instructions stored in the memory. The instructions are executable by the processor to cause the apparatus to attempt to receive, from a base station, data via a communication link, determine a size of a radio link control (RLC) status report in a first format, the RLC status report indicating a status of the data at the apparatus, compare the size of the RLC status report with a threshold, if the size of the RLC status report in the first format is less than the threshold, then transmit the RLC status report in the first format, and, if the size of the RLC status report in the first format is greater than the threshold, then transmit the RLC status report in a second format.

A sixth aspects relates to a method for wireless communication at a user equipment (UE). The method includes attempting to receive, from a first base station, data via a first communication link, generating a radio link control (RLC) status report indicating a status of the data at the UE, and transmitting, to a second base station, the RLC status report via a second communication link.

A seventh aspect relates to a method for wireless communication at a first base station. The method includes receiving, from a user equipment (UE), a radio link control (RLC) status report, wherein the RLC status report indicates a status of data transmitted by a second base station to the UE via a first communication link, and the RLC status report is received via a second communication link. The method also includes forwarding, to the second base station, the RLC status report via a backhaul link.

An eighth aspect relates to a method for wireless communication at a first base station. The method includes transmitting, to a user equipment (UE), data via a communication link, receiving, from a second base station, a radio link control (RLC) status report via a backhaul link, wherein the RLC status report indicates a status of the data at the UE, determining a portion of the data that was not successfully received by the UE based on the RLC status report, and retransmitting, to the UE, the portion of the data via the communication link.

A ninth aspect relates to a method for wireless communication at a user equipment (UE). The method includes attempting to receive, from a first base station, data via a first communication link, generating a radio link control (RLC) status report indicating a status of the data at the UE, determining a size of the RLC status report, and comparing the size of the RLC status report with a threshold. The method also includes if the size of the RLC status report is greater than the threshold, then transmitting, to a second base station, the RLC status report via a second communication link, and, if the size of the RLC status report is less than the threshold, then transmitting, to the first base station, the RLC status report via the first communication link.

A tenth aspect relates to a method for wireless communication at a user equipment (UE). The method includes attempting to receive, from a base station, data via a communication link, determining a size of a radio link control (RLC) status report in a first format, the RLC status report indicating a status of the data at the UE, and comparing the size of the RLC status report with a threshold. The method also includes if the size of the RLC status report in the first format is less than the threshold, then transmitting the RLC status report in the first format, and, if the size of the RLC status report in the first format is greater than the threshold, then transmitting the RLC status report in a second format.

An eleventh aspect relates to an apparatus for wireless communication. The apparatus includes means for attempting to receive, from a first base station, data via a first communication link, means for generating a radio link control (RLC) status report indicating a status of the data at the apparatus, and means for transmitting, to a second base station, the RLC status report via a second communication link.

A twelfth aspect relates to apparatus for wireless communication. The apparatus includes means for receiving, from a user equipment (UE), a radio link control (RLC) status report, wherein the RLC status report indicates a status of data transmitted by a base station to the UE via a first communication link, and the RLC status report is received via a second communication link. The apparatus also includes means for forwarding, to the base station, the RLC status report via a backhaul link.

A thirteenth aspects relates to an apparatus for wireless communication. The apparatus includes means for transmitting, to a user equipment (UE), data via a communication link, means for receiving, from a base station, a radio link control (RLC) status report via a backhaul link, wherein the RLC status report indicates a status of the data at the UE, means for determining a portion of the data that was not successfully received by the UE based on the RLC status report, and means for retransmitting, to the UE, the portion of the data via the communication link.

A fourteenth aspect relates to an apparatus for wireless communication. The apparatus includes means for attempting to receive, from a first base station, data via a first communication link, means for generating a radio link control (RLC) status report indicating a status of the data at the apparatus, means for determining a size of the RLC status report, means for comparing the size of the RLC status report with a threshold, means for transmitting, to a second base station, the RLC status report via a second communication link if the size of the RLC status report is greater than the threshold, and means for transmitting, to the first base station, the RLC status report via the first communication link if the size of the RLC status report is less than the threshold.

A fifteenth aspect relates to an apparatus for wireless communication. The apparatus includes means for attempting to receive, from a base station, data via a communication link, means for determining a size of a radio link control (RLC) status report in a first format, the RLC status report indicating a status of the data at the apparatus, means for comparing the size of the RLC status report with a threshold, means for transmitting the RLC status report in the first format if the size of the RLC status report in the first format is less than the threshold; means for transmitting the RLC status report in a second format if the size of the RLC status report in the first format is greater than the threshold.

A sixteenth aspect relates to a system for wireless communication. The system includes a first base station configured to transmit, to a user equipment (UE), data via a first communication link. The system also includes a second base station configured to receive, from the UE, a radio link control (RLC) status report via a second communication link, wherein the RLC status report indicates a status of the data at the UE, and forward, to the first base station, the RLC status report via a backhaul link. The first base station is further configured to determine a portion of the data that was not successfully received by the UE based on the RLC status report, and retransmit, to the UE, the portion of the data via the first communication link.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

A wireless communications system may implement dual connectivity schemes to improve throughput for wireless devices. For example, a user equipment (UE) may be simultaneously connected to a first base station (e.g., an evolved Node B (eNB)) for LTE communications and to a second base station (e.g., a next generation Node B (gNB)) for NR communications. One of the base stations may be configured as a master cell group (MCG) which controls a secondary cell group (SCG).

The wireless communications system may also implement various configurations for a dual connectivity scheme. In some wireless communications systems, the dual connectivity scheme includes an LTE anchor, where an eNB is an MCG which connects the UE to a core network. The SCG may be an NR node or gNB which connects the UE to the core network, either directly in an SCG bearer configuration or via a backhaul link with the MCG in a split bearer configuration. Dual connectivity schemes may also use an NR anchor. Thus, in some scenarios, an NR node or gNB may be the MCG while an eNB may be the SCG.

Figure 1:
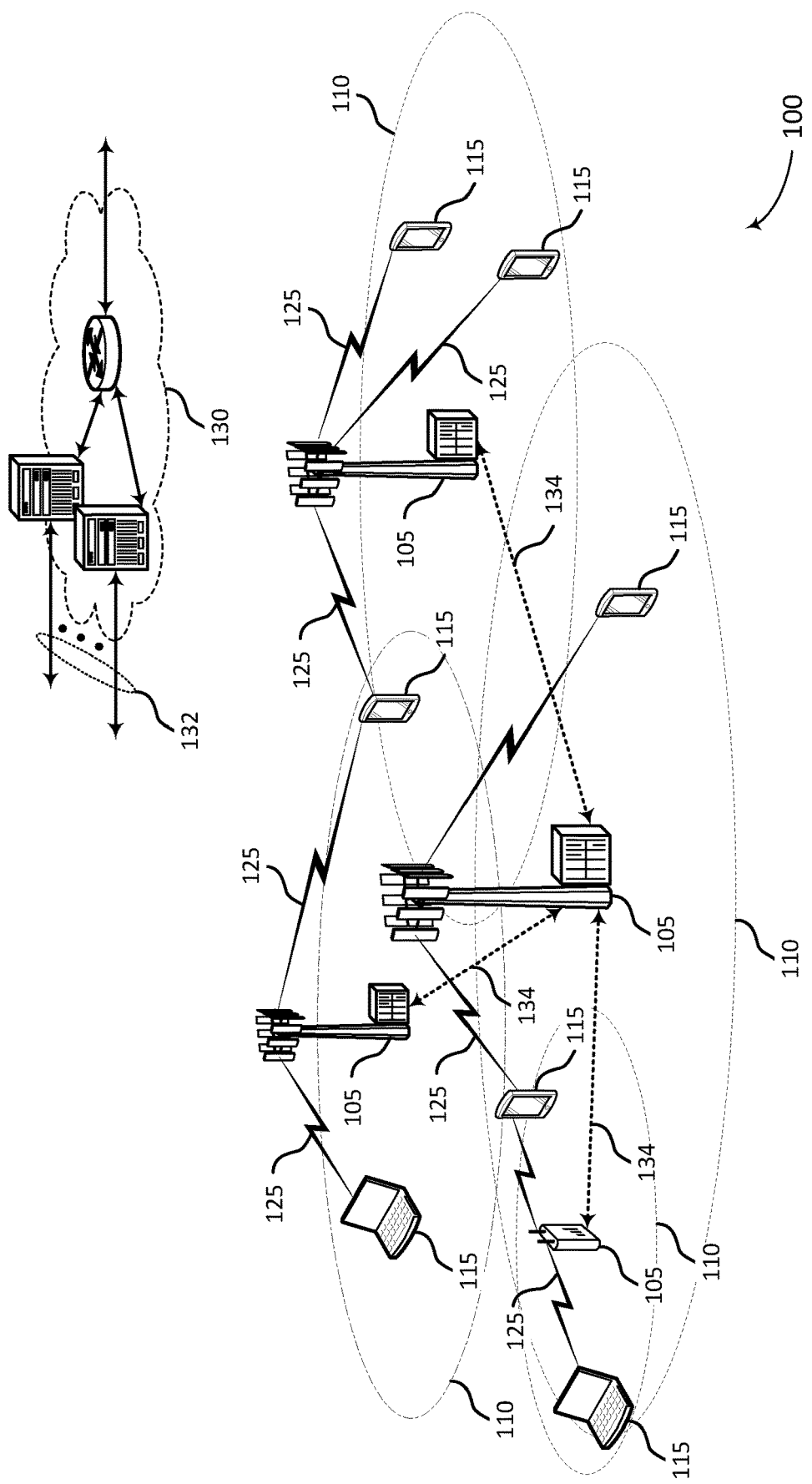
FIG. 1 shows an example of a wireless communications system that supports dual connectivity according to certain aspects of the present disclosure.

FIG. 1 shows an example of a wireless communications system 100 that supports dual connectivity in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, a New Radio (NR) network, or a combination thereof.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a respective geographic coverage area 110 in which communications with various UEs 115 is supported. Each base station 105 may provide communication coverage for the respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 and downlink transmissions from a base station 105 to a UE 115. Downlink transmissions may also be called forward link transmissions while uplink transmissions may also be called reverse link transmissions.

Each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 interface or another interface). Base stations 105 may communicate with one another over backhaul links 134 (e.g., via an X2 interface or another interface) either directly (e.g., directly between base stations 105) or indirectly (e.g., via the core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

Figure 2:
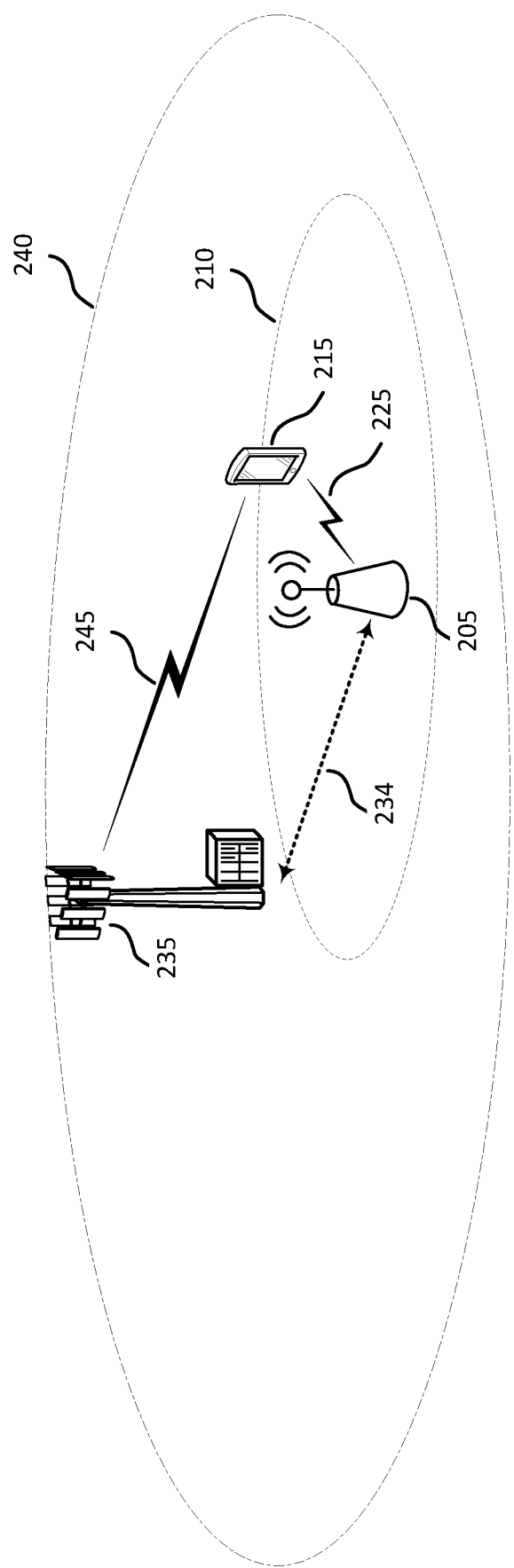
FIG. 2 illustrates an example of a dual connectivity scheme according to certain aspects of the present disclosure.

FIG. 2 illustrates an example of a dual connectivity scheme that may be implemented in the wireless communications system 100 illustrated in FIG. 1 or another wireless communications system. In this example, a UE 215 is simultaneously connected to a first base station 205 and a second base station 235. The UE 215 may correspond to one of the UEs 115 in FIG. 1, the first base station 205 may correspond to one of the base stations 105 in FIG. 1, and the second base station 235 may correspond to another one of the base stations 105 in FIG. 1. In this example, the second base station 235 may be configured as an MCG and the first base station 205 may be configured as a SCG. In certain aspects, the first base station 205 may be a gNB for NR communications and the second base station 235 may be an eNB for LTE communications, or vice versa.

The first base station 205 and the second base station 235 may communicate with one another over a backhaul link 234 (e.g., via an X2 interface or another interface). The backhaul link 234 may correspond to one of the backhaul links 134 in FIG. 1, and may include a wired link (e.g., optical fiber), a wireless link, or a combination thereof. The second base station 235 may connect the UE 215 to a core network (e.g., core network 130 in FIG. 1), and the first base station 205 may connect the UE 215 to the core network, either directly in an SCG bearer configuration or via the backhaul link 234 with the second base station 235 in a split bearer configuration.

The first base station 205 communicates with the UE 215 via a first communication link 225 in a first coverage area 210. The first communication link 225 may include downlink transmissions from the first base station 205 to the UE 215 and/or uplink transmissions from the UE 215 to the first base station 205. For the example in which the first base station 205 is a gNB using NR communications, the first communication link 225 may be an NR link.

The second base station 235 may communicate with the UE 215 via a second communication link 245 in a second coverage area 240. The second communication link 245 may include downlink transmissions from the second base station 235 to the UE 215 and/or uplink transmissions from the UE 215 to the second base station 235. For the example in which the second base station 205 is an eNB using LTE communications, the second communication link 225 may be an LTE link.

In certain aspects, the first base station 205 may communicate with the UE 215 via the first communication link 225 in a first frequency band (e.g., a millimeter wave (mmWave) spectrum). In one example, the first frequency band includes frequency range 2 (FR2), which may include frequencies above 24 GHz. In this example, the first frequency band may be above 24 GHz, meaning that the frequencies in the first frequency band are above 24 GHz. In this example, the first base station 205 may communicate with the UE 215 using NR communications or another technology utilizing FR2.

The second base station 235 may communicate with the UE 215 via the second communication link 245 in a second frequency band. In one example, the second frequency band includes frequency range 1 (FR1), which may include frequencies below 6 GHz (e.g., sub-6 GHz frequencies). In this example, the second frequency band may be below 6 GHz, meaning that the frequencies in the second frequency band are below GHz. In this example, the second base station 235 may communicate with the UE 215 using LTE communications or another technology utilizing FR1.

In one example, the first frequency band (e.g., FR2) is higher than the second frequency band (e.g., FR1), meaning that the highest frequency in the second frequency band (e.g., FR1) is less than the lowest frequency in the first frequency band (e.g., FR2). In this example, the higher frequencies in the first frequency band (e.g., FR2) may provide higher bandwidth while the lower frequencies in the second frequency band (e.g., FR1) may provide a longer range and/or a more robust communication link.

In the example in FIG. 2, the second base station 235 is shown having a longer range (and hence a larger coverage area 240) than the first base station 205. However, it is to be appreciated that the present disclosure is not limited to this example. In other implementations, the first base station 205 and the second base station 235 may have similar ranges or the first base station 205 may have a longer range than the second base station 235.

In certain aspects, the first base station 205 and the UE 215 utilize radio link control (RLC) to manage the first communication link 225. In this regard, a radio resource control (RRC) entity may configure an RLC entity at the first base station 205 and configure a corresponding RLC entity (i.e., a peer RLC entity) at the UE 215 to perform RLC functions for the first communication link 225. The RLC functions may include the UE 215 transmitting control information (i.e., control signaling) to the first base station 205 via uplink transmissions on the first communication link 225. In one example, the control information includes an RLC status report providing the first base station 205 with a status (e.g., Acknowledgement ACK and/or Negative-ACK (NACK)) of data transmitted to the UE 215 by the first base station 205.

In one example, the first base station 205 may transmit packets (e.g., Service Data Units (SDUs)) to the UE 215 via a downlink transmission on the first communication link 225. In this example, the UE 215 attempts to receive the packets, and determines whether each of the packets has been successfully received at the UE 215. The UE 215 may then generate an RLC status report indicating which packets have been successfully received at the UE 215 (e.g., with an ACK) and/or which packets have not been successfully received at the UE 215 (e.g., with a NACK). The UE 215 may then transmit the RLC status report to the first base station 205 via an uplink transmission on the first communication link 225. Upon receiving the RLC status report, the first base station 205 may identify one or more packets that were not successfully received at the UE 215 based on the RLC status report, and retransmit the identified one or more packets to the UE 215 via a downlink transmission on the first communication link 225.

In another example, the first base station 205 may segment one or more packets (e.g., SDUs) into packet segments and transmit the packet segments to the UE 215 via a downlink transmission on the first communication link 225. The UE 215 attempts to receive the packet segments, and determines whether each of the packet segments has been successfully received at the UE 215. The UE 215 may then generate an RLC status report indicating which packet segments have been successfully received at the UE 215 (e.g., with an ACK) and/or which packet segments have not been successfully received at the UE 215 (e.g., with a NACK). If one or more of the packet segments have not been successfully received (e.g., one or more packet segments have been lost and/or can not be decoded), then the UE 215 may identify the one or more packet segments in the RLC status report with segment identifiers (e.g., sequence numbers, a bitmap, etc.) and indicate a NACK for the one or more packet segments in the RLC status report. The UE 215 may then transmit the RLC status report to the first base station 205 via an uplink transmission on the first communication link 225.

Upon receiving the RLC status report, the first base station 205 may identify one or more packet segments that were not successfully received at the UE 215 based on the RLC status report. The first base station 205 may then retransmit the identified one or more packet segments to the UE 215 via a downlink transmission on the first communication link 225. Once the UE 215 has successfully received all of the packet segments for a packet, the UE 215 may reassemble the packet and process the reassembled packet (e.g., at an upper protocol layer).

The second base station 235 and the UE 215 may also utilize RLC to manage the second communication link 245. In this regard, an RRC entity may configure an RLC entity at the second base station 235 and configure a corresponding RLC entity (i.e., a peer RLC entity) at the UE 215 to perform RLC functions for the second communication link 245. The RLC functions may include the UE 215 transmitting control information (i.e., control signaling) to the second base station 235 via uplink transmissions on the second communication link 245. In one example, the control information includes an RLC status report providing the second base station 235 with a status (e.g., ACK and/or NACK) of data transmitted to the UE 215 by the second base station 235.

The RLC for the first communication link 225 and the RLC for the second communication link 245 may operate independently of one another. The RLC entity at the first base station 205 may be specific to the first communication link 225 and perform RLC functions related to the first communication link 225 (e.g., retransmission of packet segments on the first communication link 225). The RLC entity at the second base station 235 may be specific to the second communication link 245 and perform RLC functions related to the second communication link 245 (e.g., retransmission of packet segments on the second communication link 245).

In certain aspects, the range of uplink transmissions from the UE 215 to the first base station 205 may be shorter than the range of downlink transmissions from the first base station 205 to the UE 215. The asymmetry in the uplink (UL) range and the downlink (DL) range may be due to one or more factors including lower transmit power at the UE 215, the antenna configuration at the UE 215, link budget, etc. The shorter UL range limits the range of the first communication link 225 (and hence the coverage area 210) even for cases where the UE 215 is not uploading user data to the first base station 205. This is because, when the first base station 205 downloads data to the UE 215 via the first communication link 225, the UE 215 needs to transmit control information (e.g., RLC status reports) to the first base station 205 to maintain the link 225. Since the range of the first communication link 225 (and hence the coverage area 210) is limited by the UL range, the shorter UL range effectively reduces the range of the first communication link 225 (and hence the coverage area 210).

To address the above problem, the UE 215 transmits control information (e.g., RLC status report) for the first communication link 225 to the second base station 235 via the second communication link 245 according to certain aspects of the present disclosure. Having the UE 215 transmit the control information (e.g., RLC status reports) over the second communication link 245 instead of the first communication link 225 alleviates the limit (i.e., constraint) that the UL range for the first communication link 225 places on the range of the first communication link 225, which increases (i.e., enhances) the range of the first communication link 225.

In certain aspects, the second base station 235 (which may be configured as the MCG) configures a logical channel for carrying control information (e.g., RLC status reports) for the first communication link 225 from the UE 215 to the second base station 235. The logic channel for the control information (e.g., RLC status reports) may be one of multiple logical channels configured between the second base station 235 and the UE 215, in which each of the logical channels may be used for carrying certain types of data and/or control information between the second base station 235 and the UE 215. Hereinafter, logical channel refers to the logical channel configured for carrying the control information (e.g., RLC status reports) for the first communication link 225 unless stated otherwise.

In certain aspects, the UE 215 generates control information for the first communication link 225. For the example of RLC status reports, the UE 215 generates an RLC status report including ACK/NACK information for data (e.g., packets and/or packet segments) transmitted to the UE 215 from the first base station 205 via the first communication link 225. The UE 215 then transmits the control information on the logical channel via the second communication link 245 to the second base station 235. By transmitting the control information via the second communication link 245 instead of the first communication link 225, the UE 215 alleviates the limit (i.e., constraint) that the UL range for the first communication link 225 places on the range of the first communication link 225, which increases (i.e., enhances) the range of the first communication link 225.

As discussed above, the second frequency band (e.g., FR1) used by the second communication link 245 may be lower than the first frequency band (e.g., FR2) used by the first communication link 225. In this example, the lower frequency band for the second communication link 245 may allow the second communication link 245 to achieve a longer UL range and/or greater robustness for carrying the control information (e.g., RLC status reports) compared with the first communication link 225. In this example, the UE 215 may attempt to receive data (e.g., packets and/or packet segments) from the first base station 205 in the first frequency band (e.g., FR2) over the first communication link 225, and transmit a corresponding RLC status report in the second frequency band (e.g., FR1) over the second communication link 245. The RLC status report provides a status (e.g., ACK and/or NACK) of the data at the UE 215 with ACK indicating data that has been successfully received and NACK indicating data that has not been successfully received (e.g., data that has been lost or can not be decoded).

Upon receiving the control information (e.g., RLC status report) for the first communication link 225, the second base station 235 may forward the control information (e.g., RLC status report) to the first base station 205 via the backhaul link 234. In this regard, the second base station 235 may be configured to forward control information received on the logical channel to the first base station 205 via the backhaul link 234. For the example of RLC status reports, the second base station 235 forwards an RLC status report received on the logical channel from the UE 215 to the first base station 205 via the backhaul link 234. This is because the RLC status report received on the logical channel is destined for the RLC entity at the first base station 205, which handles retransmissions on the first communication link 225. Since the RLC entity at the second base station 235 is specific to the second communication link 245, the RLC entity at the second base station 235 does not need to process the RLC status report received on the logical channel. Thus, the second base station 235 may acts as a relay that relays the control information (e.g., RLC status report) for the first communication link 225 received from the UE 215 to the first base station 205.

The first base station 205 receives the control information (e.g., RLC status report) for the first communication link 225 from the second base station 235 via the backhaul link 234 and processes the received control information. For the example in which the control information includes an RLC status report, the first base station 205 may retransmit one or more packets and/or packet segments identified in the RLC status report with a NACK. The first base station 205 may retransmit the one or more packets and/or packet segments via a downlink transmission on the first communication link 225 in the first frequency band (e.g., FR2).

In certain aspects, the UE 215 may transmit an RLC status report that is larger than a certain threshold to the second base station 235 via the second communication link 245, and transmit an RLC status report that is smaller than the threshold to the first base station 205 via the first communication link 225. Thus, in these aspects, the UE 215 may transmit an RLC status report that is smaller than the threshold to the first base station 205 via the first communication link 225. This is because the UE 215 may be able to transmit a smaller RLC status report over a longer UL range compared with a larger RLC status report. As a result, the limitation that the UL range places on the range of the first communication link 225 may be less of an issue for a small RLC status report compared with a large RLC status report. In this case, a longer UL range may be achieved for a smaller RLC status report by using a lower code rate (which may increase robustness), transmitting in a shorter time interval, etc. Transmitting a small RLC status report via the first communication link 225 may reduce latency by avoiding the latency associated with forwarding the RLC status report from the second base station 235 to the first base station 205 via the backhaul link 234.

Figure 3:
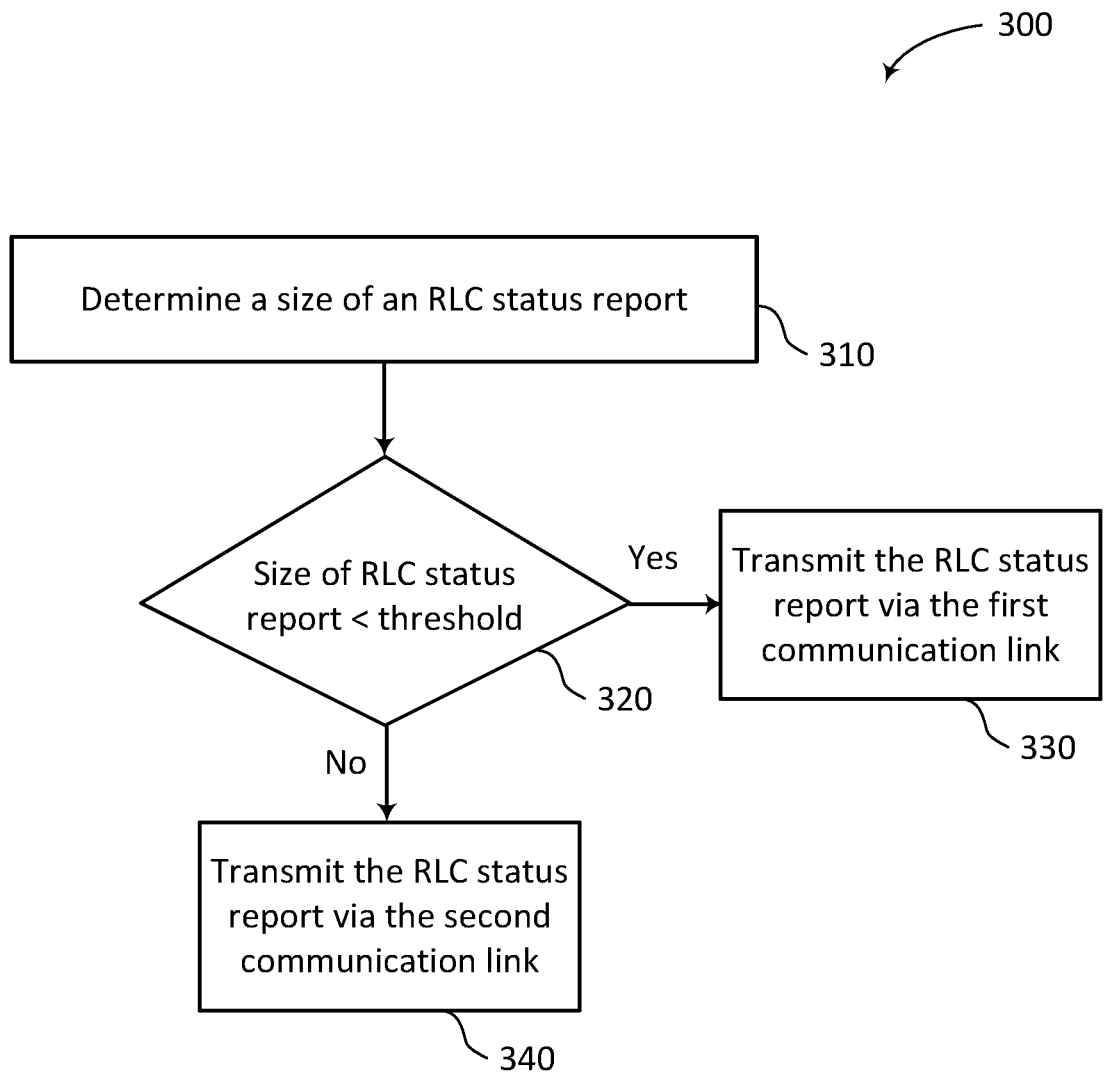
FIG. 3 illustrates an exemplary method according to certain aspects of the present disclosure.

FIG. 3 illustrates an exemplary method 300 that may be performed by the UE 215 to determine whether to transmit an RLC status report via the second communication link 245 or transmit the RLC status report via the first communication link 225 based on a size of the RLC status report.

At block 310, the UE 215 determines a size of an RLC status report (e.g., in bits, bytes or another unit of size). In this example, the size of the RLC status report may depend on the packet rate between the first base station 205 and the UE 215, the time period since the last RLC status report, and/or other factors.

At block 320, the UE 215 compares the size of the RLC status report with a threshold (e.g., in bits, bytes or another unit of size). In one example, the threshold may be a configurable parameter that is set by the first base station 205 or the second base station 235. In this example, the UE 215 may receive an instruction from the first base station 205 or the second base station 235 via the first communication link 225 or the second communication link 245, respectively, indicating a value for the threshold. The UE 215 may then set the threshold to the value. If the size of the RLC status report is less than the threshold, then the UE 215 proceeds to block 330, and if the size of the RLC status report is greater than the threshold, then the UE 215 proceeds to block 340.

At block 330, the UE 215 transmits the RLC status report to the first base station 205 via the first communication link 225. In this case, the first base station 205 receives the RLC status report via the first communication link 225 and processes the RLC status report as discussed above.

At block 340, the UE 215 transmits the RLC status report to the second base station 235 via the second communication link 245. The UE 215 may transmit the RLC status report on the logical channel discussed above. In this case, the second base station 235 receives the RLC status report via the second communication link 245 and forwards the RLC status report to the first base station 205 via the backhaul link 234. The first base station 205 receives the RLC status report via the backhaul link 234 and processes the RLC status report as discussed above.

In one implementation, the UE 215 may transmit the RLC status report to the first base station 205 via the first communication link 225 if the size of the RLC status report is equal to the threshold. In another implementation, the UE 215 may transmit the RLC status report to the second base station 235 via the second communication link 245 if the size of the RLC status report is equal to the threshold.

In certain aspects, the UE 215 may generate an RLC status report in a first format or a second format. In these aspects, the first base station 205 segments one or more packets into packet segments and transmits the packet segments to the UE 215 via a downlink transmission on the first communication link 225. The UE 215 may then determine whether each of the packet segments has been successfully received at the UE 215, and generate an RLC status report in the first format or the second format based on the determination.

For the first format, the RLC status report may identify each individual packet segment that has been successfully received at the UE 215 (e.g., with an ACK) and/or each individual packet segment that has not been successfully received at the UE 215 (e.g., with a NACK). The RLC status report may identify each individual packet segment with a respective segment identifier (e.g., sequence number, bitmap, etc.), and indicate an ACK for packet segments that are successfully received and a NACK for packet segments that are not successfully received. The first format facilitates efficient retransmission of data by the first base station 205. This is because, if one packet segment in a packet is not successfully received (e.g., lost), then the first base station 205 only needs to retransmit the one packet segment instead of retransmitting the entire packet.

For the second format, the RLC status report may identify the packets that have been successfully received at the UE 215 (e.g., with an ACK) and/or packets that have not been successfully received at the UE 215 (e.g., with a NACK). For purposes of the second format, a packet is considered to not be successfully received if at least one of the packet segments in the packet is not successfully received. Thus, in the second format, the RLC status report may identify a packet as not being successfully received (e.g., with a NACK) if one of the packet segments in the packet is not successfully received (e.g., lost or not successfully decoded) regardless of whether the other packet segments in the packet have been successfully received. Because the second format does not report the status of individual packet segments, the second format reduces the size of the RLC status report compared with the first format. However, the reduction in size of the RLC status report may come at the expense of less efficient retransmission of data. This is because the second format does not convey information at the segment level. Thus, if one packet segment is not successfully received at the UE 215, then the first base station 205 may need to retransmit the entire packet. However, the smaller size of the RLC status report provided by the second format may allow the RLC status report to be transmitted over a longer UL range compared with the first format. Therefore, there may be a tradeoff between the UL range for transmitting RLC status report and the efficiency of data retransmissions by the first base station 205.

Figure 4:
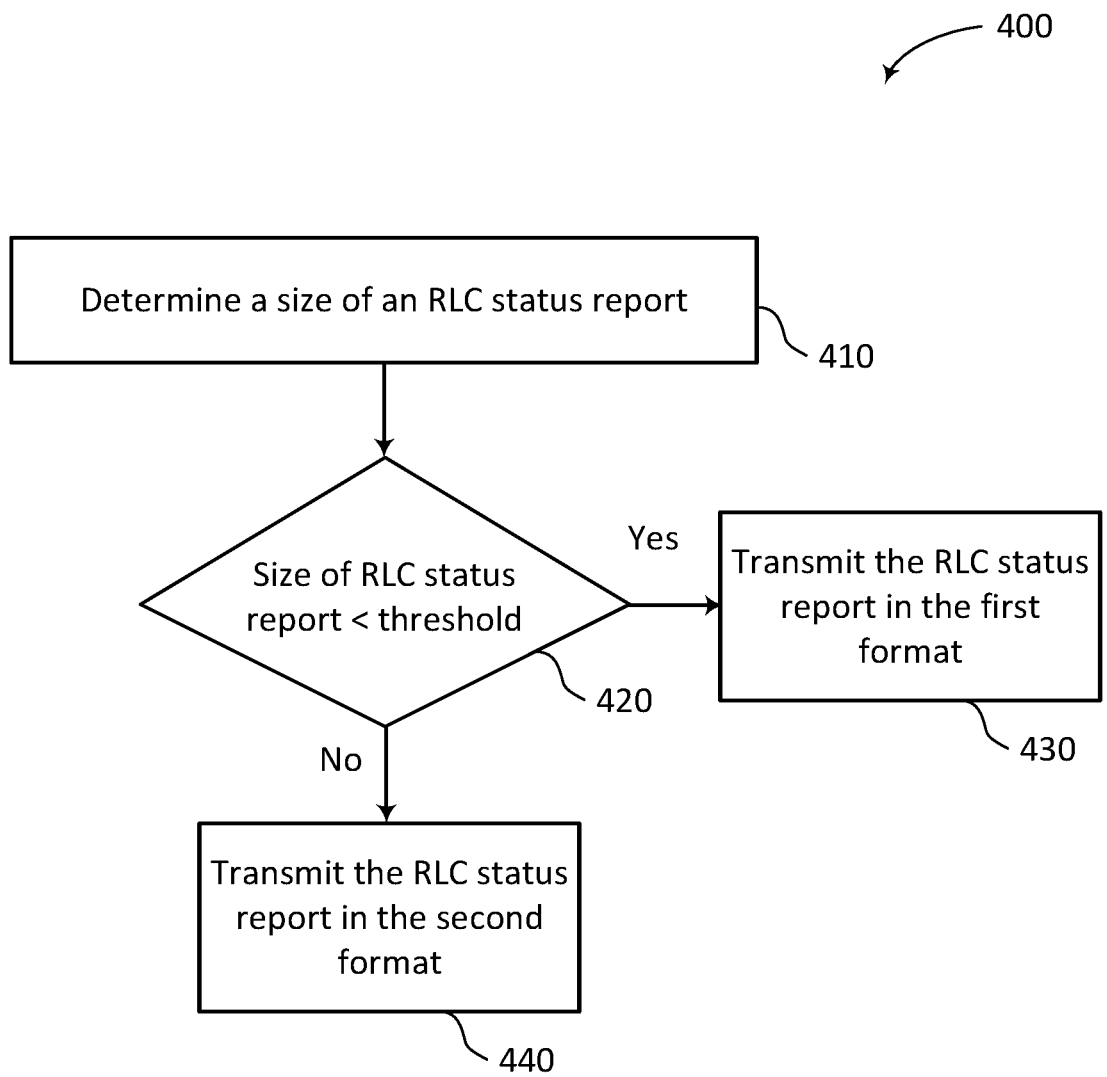
FIG. 4 illustrates another exemplary method according to certain aspects of the present disclosure.

FIG. 4 illustrates an exemplary method 400 that may be performed by the UE 215 to determine whether to transmit an RLC status report in the first format or a second format based on a size of the RLC status report.

At block 410, the UE 215 determines a size of an RLC status report (e.g., in bits, bytes or another unit of size). In this example, the size of the RLC status report may depend on the packet rate between the first base station 205 and the UE 215, the time period since the last RLC status report, and/or other factors. The UE 215 may determine the size of the RLC status report in the first format.

At block 420, the UE 215 compares the size of the RLC status report with a threshold (e.g., in bits, bytes or another unit of size). In one example, the threshold may be a configurable parameter that is set by the first base station 205 or the second base station 235. In this example, the UE 215 may receive an instruction from the first base station 205 or the second base station 235 via the first communication link 225 or the second communication link 245, respectively, indicating a value for the threshold. The UE 215 may then set the threshold to the value. If the size of the RLC status report is less than the threshold, then the UE 215 proceeds to block 430, and if the size of the RLC status report is greater than the threshold, then the UE 215 proceeds to block 440.

At block 430, the UE 215 transmits the RLC status report in the first format. For example, the UE 215 may transmit the RLC status report in the first format to the first base station 205 via the first communication link 225. In another example, the UE 215 may transmit the RLC status report in the first format to the second base station 235 via the second communication link 245. In this example, the second base station 235 may forward the RLC status report to the first base station 205 via the backhaul link 234.

At block 440, the UE 215 transmits the RLC status report in the second format. For example, the UE 215 may transmit the RLC status report in the second format to the first base station 205 via the first communication link 225. In another example, the UE 215 may transmit the RLC status report in the second format to the second base station 235 via the second communication link 245. In this example, the second base station 235 may forward the RLC status report to the first base station 205 via the backhaul link 234.

In one implementation, the UE 215 may transmit the RLC status report in the first format if the size of the RLC status report is equal to the threshold. In another implementation, the UE 215 may transmit the RLC status report in the second format if the size of the RLC status report is equal to the threshold.

Figure 5:
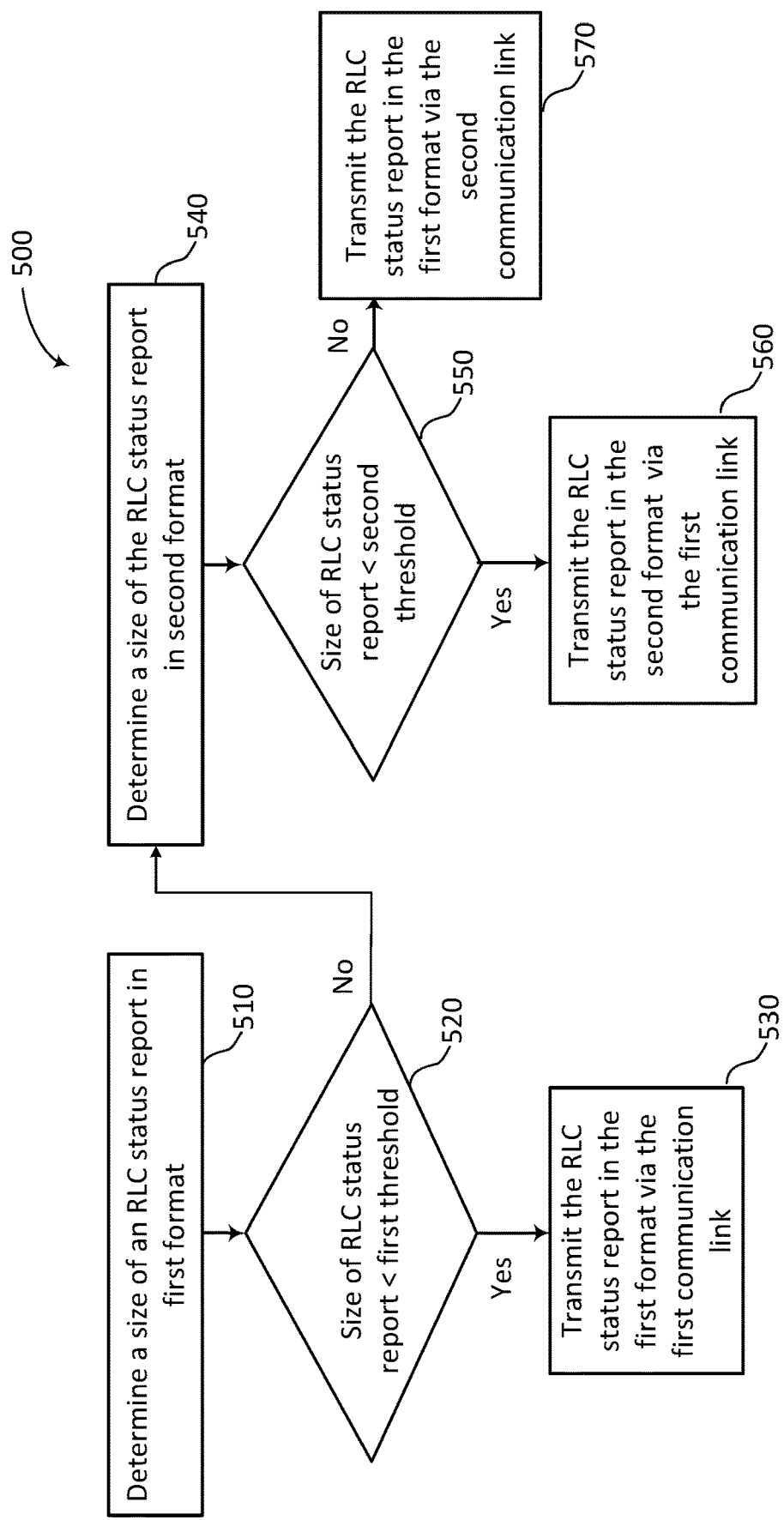
FIG. 5 illustrates yet another exemplary method according to aspects of the present disclosure.

Aspects of the exemplary method 300 illustrated in FIG. 3 may be combined with aspects of the exemplary method 400 illustrated in FIG. 4. In this regard, FIG. 5 illustrates an exemplary method 500 combining aspects of the method 300 in FIG. 3 with aspects of the method 400 in FIG. 4 according to certain aspects. The method 500 may be performed by the UE 215.

At block 510, the UE 215 determines a size of an RLC status report (e.g., in bits, bytes or another unit of size) in the first format. In this example, the size of the RLC status report may depend on the packet rate between the first base station 205 and the UE 215, the time period since the last RLC status report, and/or other factors.

At block 520, the UE 215 compares the size of the RLC status report in the first format with a first threshold (e.g., in bits, bytes or another unit of size). In one example, the first threshold may be a configurable parameter that is set by the first base station 205 or the second base station 235. If the size of the RLC status report in the first format is less than the first threshold, then the UE 215 proceeds to block 530, and if the size of the RLC status report is greater than the threshold, then the UE 215 proceeds to block 540.

At block 530, the UE 215 transmits the RLC status report to the first base station 205 in the first format via the first communication link 225. In this case, the first base station 205 receives the RLC status report via the first communication link 225 and processes the RLC status report as discussed above.

At block 540, the UE 215 determines a size of an RLC status report (e.g., in bits, bytes or another unit of size) in the second format. The size of the RLC status report in the second format is less than the size of the RLC status report in the first format since the second format conveys less information, as discussed above.

At block 550, the UE 215 compares the size of the RLC status report in the second format with a second threshold (e.g., in bits, bytes or another unit of size). The second threshold may be the same as the first threshold or different from the first threshold. In one example, the second threshold may be a configurable parameter that is set by the first base station 205 or the second base station 235. If the size of the RLC status report in the second format is less than the second threshold, then the UE 215 proceeds to block 560, and if the size of the RLC status report is greater than the threshold, then the UE 215 proceeds to block 570.

At block 560, the UE 215 transmits the RLC status report to the first base station 205 in the second format via the first communication link 225. In this case, the first base station 205 receives the RLC status report via the first communication link 225 and processes the RLC status report as discussed above.

At block 570, the UE 215 transmits the RLC status report to the second base station 235 in the first format via the second communication link 245. The UE 215 may transmit the RLC status report on the logical channel discussed above. In this case, the second base station 235 receives the RLC status report via the second communication link 245 and forwards the RLC status report to the first base station 205 via the backhaul link 234. The first base station 205 receives the RLC status report via the backhaul link 234 and processes the RLC status report as discussed above.

Figure 6:
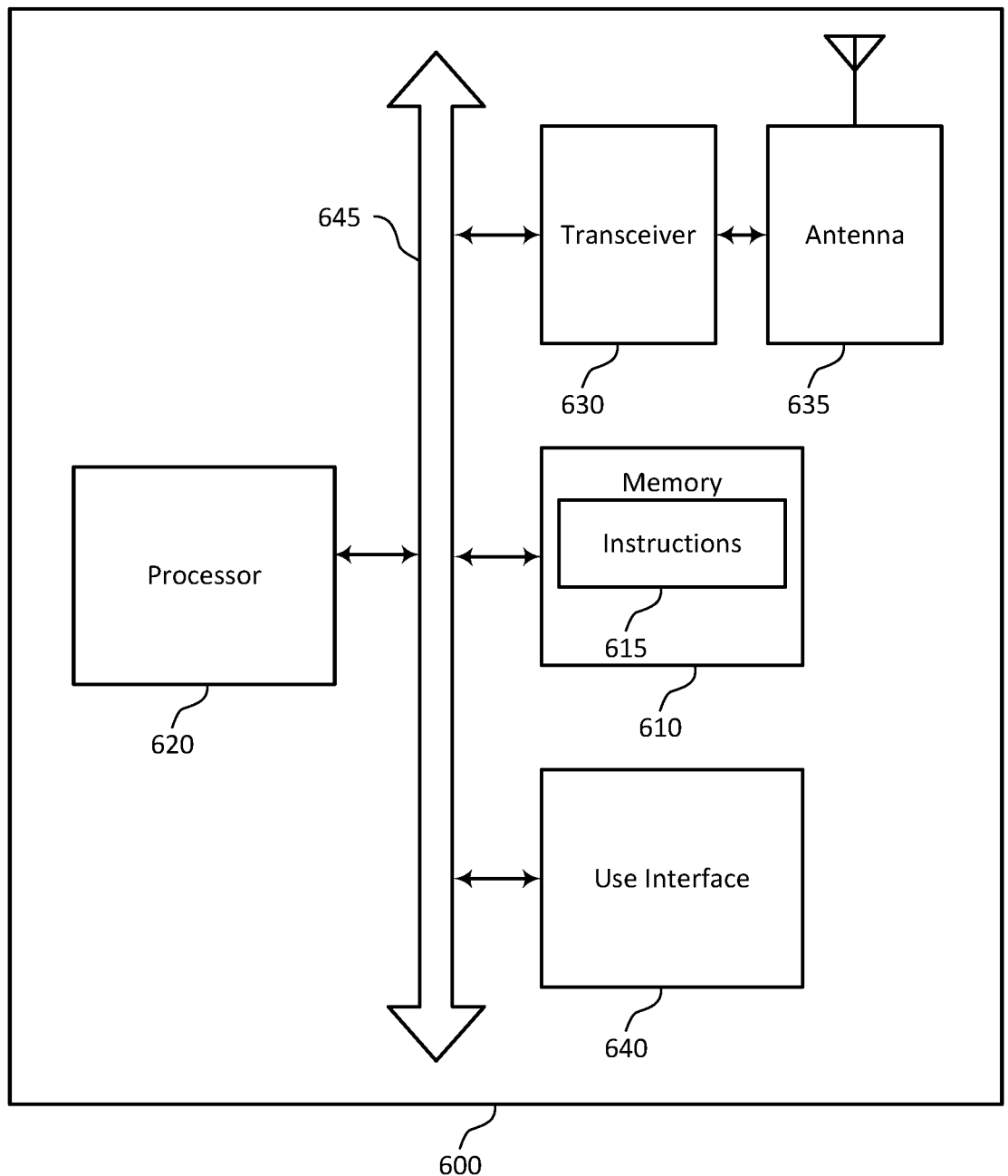
FIG. 6 shows an example device in which aspects of the present disclosure may be implemented.

FIG. 6 illustrates an example device 600 according to certain aspects of the present disclosure. The device 600 may be configured to operate in a base station (e.g., the first base station 205 or the second base station 235) or a UE (e.g., UE 215) and to perform one or more of the operations described herein. The device 600 may include a processor 620, a memory 610, a transceiver 630, one or more antennas 635, and a user interface 640. These components may be in electronic communication via one or more buses 645.

The memory 610 may store instructions 615 that are executable by the processor 620 to cause the device 600 to perform one or more of the operations described herein. The processor 620 may include a general-purpose processor, a digital signal processor (DSP), a central processing unit (CPU), a microcontroller, an application specific integrated circuit (ASIC), a field programmable gate array (FPGA), a programmable logic device, a discrete gate or transistor logic component, a discrete hardware component, or any combination thereof. The memory 610 may include, by way of example, random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives, or any other suitable storage medium, or any combination thereof.

The transceiver 630 may communicate bi-directionally, via one or more antennas 635 and/or wired connection, with one or more other transceivers. For the case of a UE (e.g., UE 215), the transceiver 630 may communicate with one or more other transceivers in one or more base stations (e.g., the first base station 205 and/or the second base station 235). For the case of a base station (e.g., the first base station 205 or the second base station 235), the transceiver 630 may communicate with another transceiver in a UE (e.g., UE 215) and/or another transceiver in another base station (e.g., the first base station 205 or the second base station 235) via, for example, a wireless or wired backhaul link (e.g., backhaul link 234). For the case of a UE (e.g., UE 215), the transceiver 630 may be configured for dual connectivity with multiple base stations (e.g., the first base station 205 and the second base station 235). For LTE-NR dual connectivity, the transceiver 630 may be configured to communicate with one of the base stations using LTE communications, and to communicate with another one of the base stations using NR communications. The transceiver 630 may also include a modem to modulate packets from the processor 620 and provide the modulated packets to the antennas 635 for transmission, and to demodulate packets received from the antennas 635 and provide the demodulated packets to the processor 620. The packets may include user data and/or control information (e.g., RLC status report). In some implementations, the packets may be segmented.

In the case of a UE (e.g., UE 215), the device 600 may include a user interface 640 coupled to the processor 620. The user interface 640 may be configured to receive data from a user (e.g., via keypad, mouse, joystick, etc.) and provide the data to the processor 620. The user interface 640 may also be configured to output data from the processor 620 to the user (e.g., via a display, a speaker, etc.). In this case, the data may undergo additional processing before being output to the user. In the case of a base station (e.g., the first base station 205 or the second base station 235), the user interface 640 may be omitted.

It is to be appreciated that each of the first base station 205, the second base station 235, and the UE 215 may be implemented with a separate instance of the device 600.

Figure 7:
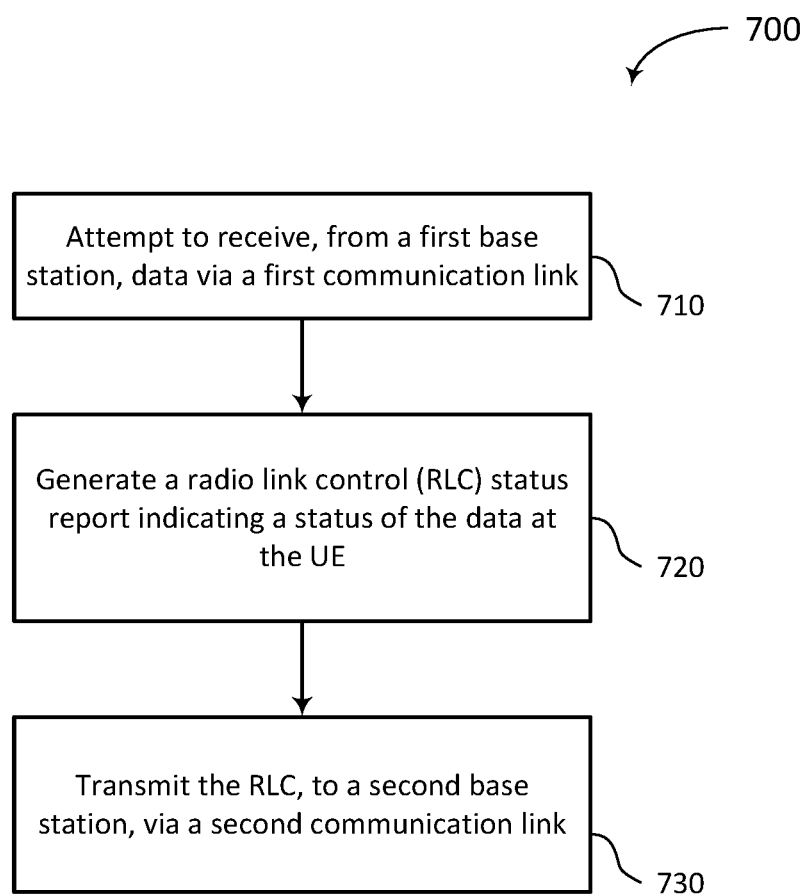
FIG. 7 illustrates an exemplary method for wireless communication according to aspects of the present disclosure.

FIG. 7 illustrates a method 700 for wireless communication at a user equipment (UE) according to certain aspects of the present disclosure. The method 700 may be performed by the UE 215.

At block 710, the UE attempts to receive, from a first base station, data via a first communication link. The first base station may correspond to the first base station 205 and the first communication link may correspond to the first communication link 225. The UE may attempt to receive the data using the transceiver 630. The first communication link may include an NR link.

At block 720, the UE generates a radio link control (RLC) status report indicating a status of the data at the UE. The RLC status report may indicate packets or packet segments that were not successfully received by the UE. In one example, the RLC status report may be generated by the processor 620.

At block 730, the UE transmits, to a second base station, the RLC status report via a second communication link. The second base station may correspond to the second base station 235 and the second communication link may correspond to the second communication link 245. In one example, the RLC status report may be transmitted by the transceiver 630. The second communication link may include an LTE link.

Figure 8:
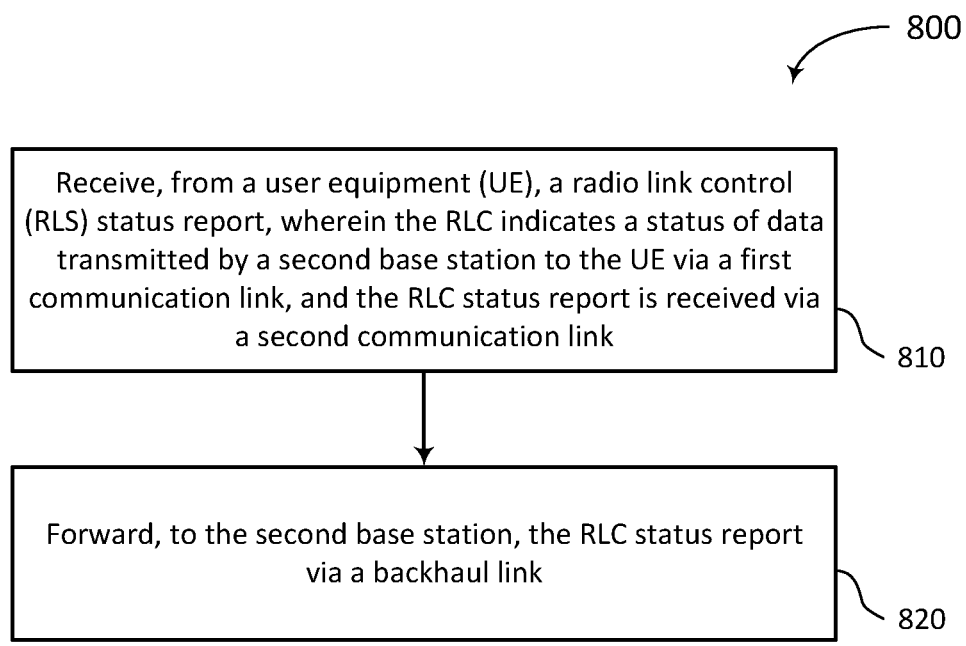
FIG. 8 illustrates another exemplary method for wireless communication according to aspects of the present disclosure.

FIG. 8 illustrates a method 800 for wireless communication at a first base station according to certain aspects of the present disclosure. The first base station may correspond to the second base station 235.

At block 810, the first base station receives, from a user equipment (UE), a radio link control (RLC) status report, wherein the RLC status report indicates a status of data transmitted by a second base station to the UE via a first communication link, and the RLC status report is received via a second communication link. The first communication link may correspond to the first communication link 225, the second base station may correspond to the first base station 205, and the second communication link may correspond to the second communication link 245. The RLC status report may be received by the transceiver 630. The RLC status report may indicate packets or packet segments that were not successfully received by the UE. The UE may correspond to the UE 215.

At block 820, the first base station forwards, to the second base station, the RLC status report via a backhaul link. The backhaul link may correspond to backhaul link 234. The RLC status report may be forwarded on the backhaul link by the transceiver 630.

Figure 9:
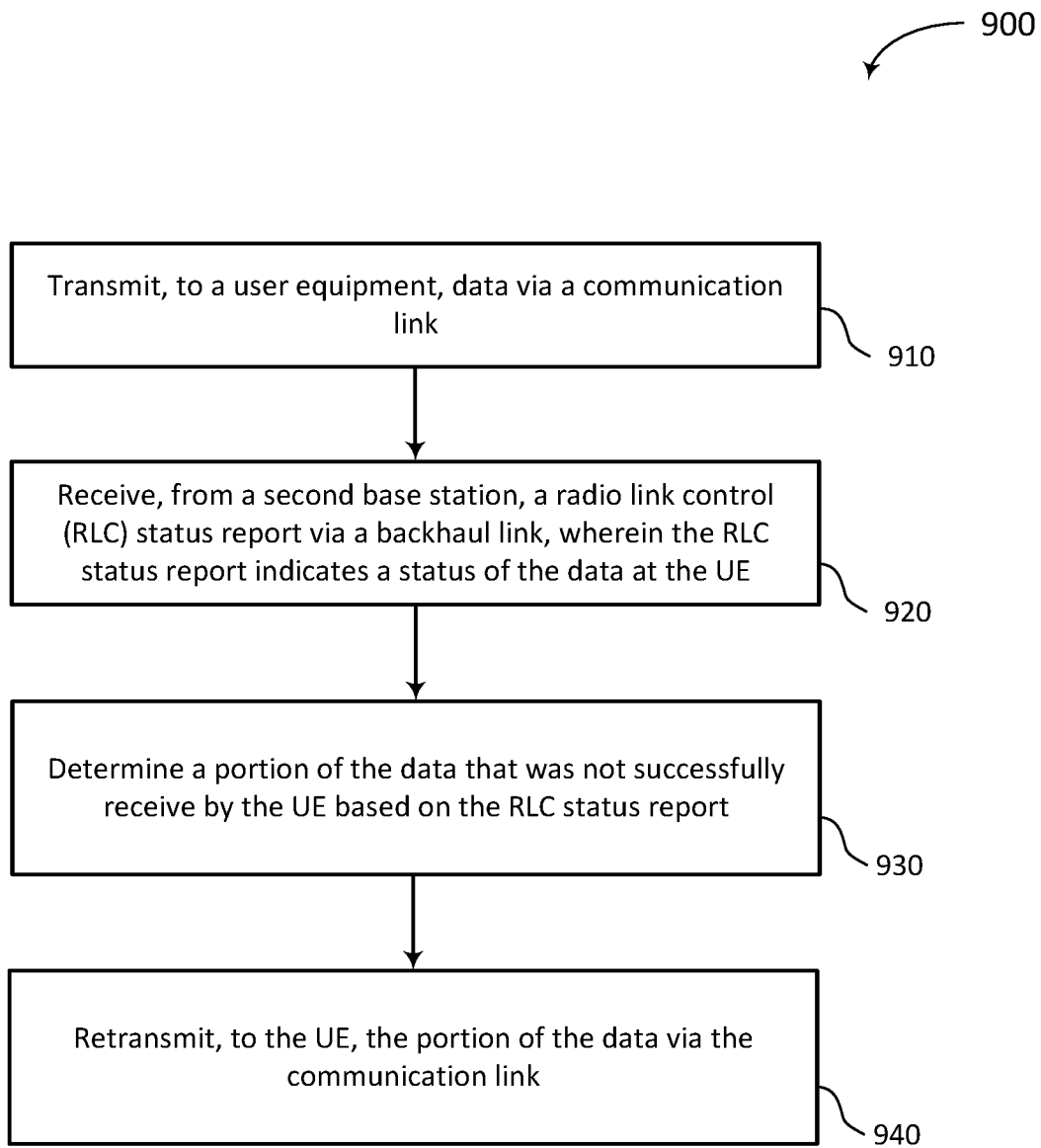
FIG. 9 illustrates yet another exemplary method for wireless communication according to aspects of the present disclosure.

FIG. 9 illustrates a method 900 for wireless communication at a first base station according to certain aspects of the present disclosure. The first base station may correspond to the first base station 205.

At block 910, the first base station transmits, to a user equipment (UE), data via a communication link. The data may be transmitted by the transceiver 630, the communication link may correspond to the first communication link 225, and the UE may correspond to the UE 215.

At block 920, the first base station receives, from a second base station, a radio link control (RLC) status report via a backhaul link, wherein the RLC status report indicates a status of the data at the UE. The second base station may correspond to the second base station 235 and the backhaul link may correspond to the backhaul link 234. The RLC status report may be received by the transceiver 630.

At block 930, the first base station determines a portion of the data that was not successfully received by the UE based on the RLC status report. The portion of the data may include packets or packet segments in the data that were not successfully received by the UE. The determination may be performed by the processor 620.

At block 940, the first base station retransmits, to the UE, the portion of the data via the communication link. The portion of the data may be retransmitted by the transceiver 630.

Figure 10:
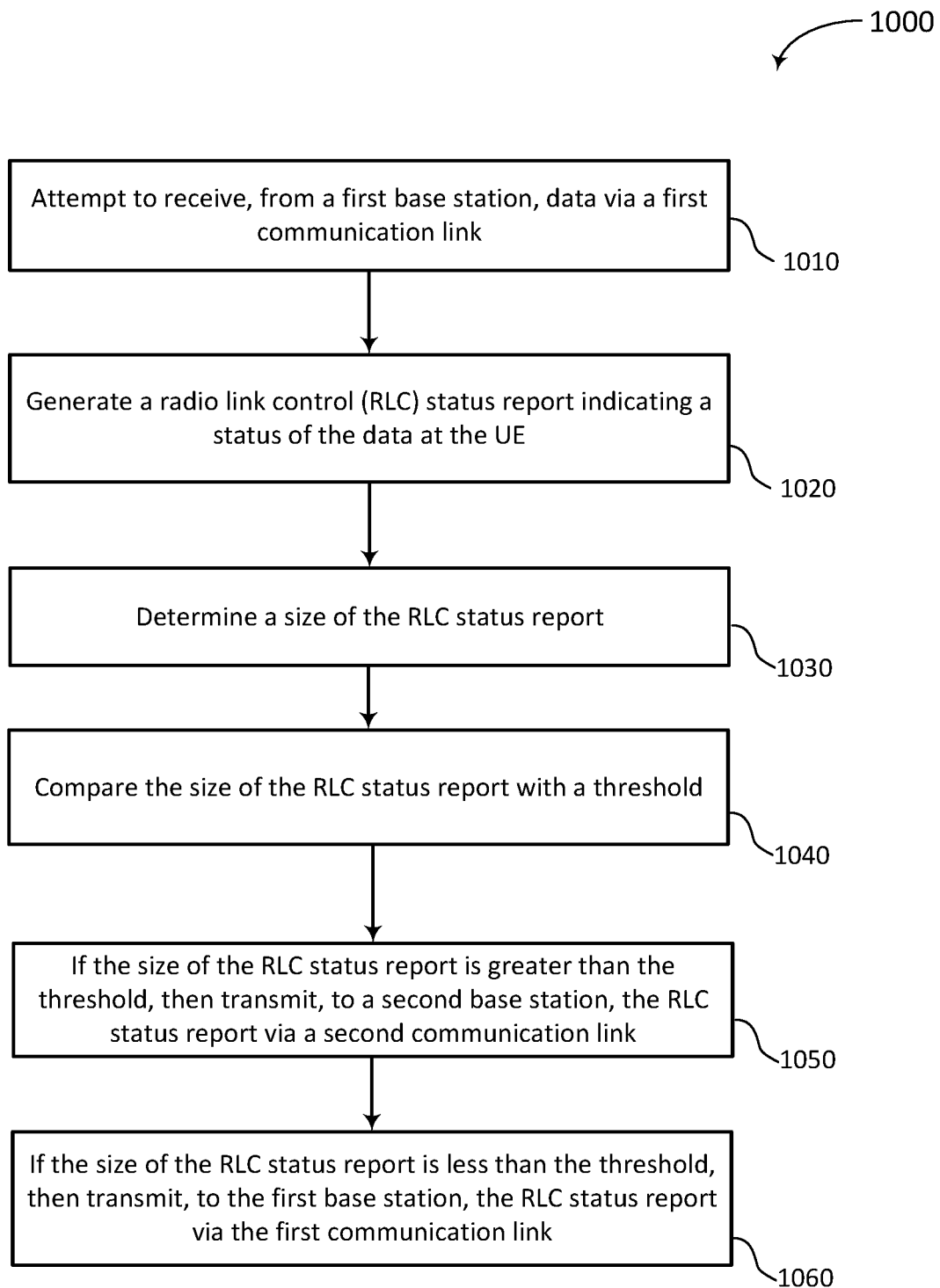
FIG. 10 illustrates still another exemplary method for wireless communication according to aspects of the present disclosure.

FIG. 10 illustrates a method 1000 for wireless communication at a user equipment (UE) according to certain aspects of the present disclosure. The method 1000 may be performed by the UE 215.

At block 1010, the UE attempts to receive, from a first base station, data via a first communication link. The first base station may correspond to the first base station 205 and the first communication link may correspond to the first communication link 225. The UE may attempt to receive the data using the transceiver 630. The first communication link may include an NR link.

At block 1020, the UE generates a radio link control (RLC) status report indicating a status of the data at the UE. The RLC status report may indicate packets or packet segments that were not successfully received by the UE. In one example, the RLC status report may be generated by the processor 620.

At block 1030, the UE determines a size of the RLC status report. The size of the RLC status report may be determined by the processor 620.

At block 1040, the UE compares the size of the RLC status report with a threshold. The comparison may be performed by the processor 620.

At block 1050, if the size of the RLC status report is greater than the threshold, then the UE transmits, to a second base station, the RLC status report via a second communication link. The second base station may correspond to the second base station 235 and the second communication link may correspond to the second communication link 245. The RLC status report may be transmitted by the transceiver 630.

At block 1060, if the size of the RLC status report is less than the threshold, then the UE transmits, to the first base station, the RLC status report via the first communication link. The RLC status report may be transmitted by the transceiver 630.

Figure 11:
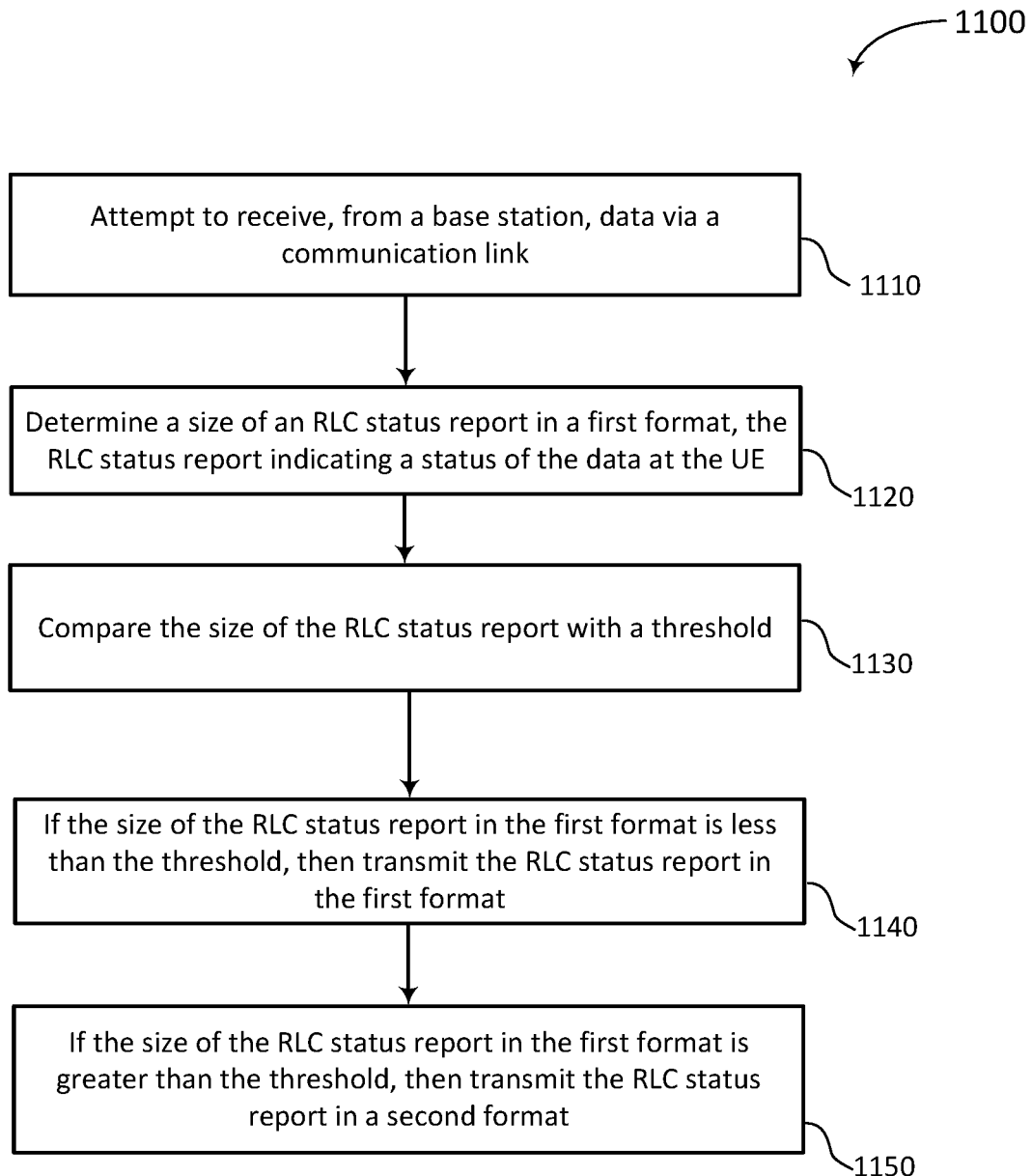
FIG. 11 illustrates a further exemplary method for wireless communication according to aspects of the present disclosure.

FIG. 11 illustrates a method 1100 for wireless communication at a user equipment (UE) according to certain aspects of the present disclosure. The method 1100 may be performed by the UE 215.

At block 1110, the UE attempts to receive, from a base station, data via a first communication link. The base station may correspond to the first base station 205 and the communication link may correspond to the first communication link 225. The UE may attempt to receive the data using the transceiver 630. The communication link may include an NR link.

At block 1120, the UE determines a size of a radio link control (RLC) status report in a first format, the RLC status report indicating a status of the data at the UE. The size of the RLC status report may be determined by the processor 620.

At block 1130, the UE compares the size of the RLC status report with a threshold. The comparison may be performed by the processor 620.

At block 1140, if the size of the RLC status report in the first format is less than the threshold, then the UE transmits the RLC status report in the first format. The RLC status report may be transmitted by the transceiver 630.

At block 1150, if the size of the RLC status report in the first format is greater than the threshold, then the UE transmits the RLC status report in a second format. The RLC status report may be transmitted by the transceiver 630. In one example, the RLC status report identifies individual packet segments in the data that are not successfully received by the UE in the first format, and does not identify individual packet segments in the data that are not successfully received by the UE in the second format. The first format and the second format may correspond to the first format and the second format discussed above with reference to FIG. 4. In one example, the size of the RLC status report is smaller in the second format than the first format by conveying less information in the second format.

Implementation examples are described in the following numbered clauses:

1. An apparatus for wireless communication, comprising:
   a processor;
   a memory coupled with the processor; and
   instructions stored in the memory and executable by the processor to cause the apparatus to:
      attempt to receive, from a first base station, data via a first communication link;
      generate a radio link control (RLC) status report indicating a status of the data at the apparatus; and
      transmit, to a second base station, the RLC status report via a second communication link.

2. The apparatus of clause 1, wherein the instructions cause the apparatus to:
   attempt to receive the data via the first communication link in a first frequency band; and
   transmit the RLC status report via the second communication link in a second frequency band.

3. The apparatus of clause 2, wherein the first frequency band is higher than the second frequency band.

4. The apparatus of clause 3, wherein the first frequency band is above 24 GHz, and the second frequency band is below 6 GHz.

5. The apparatus of any one of clauses 1 to 4, wherein the first base station is configured as a secondary cell group (SCG) and the second base station is configured as a master cell group (MCG).

6. The apparatus of any one of clauses 1 to 5, wherein the data includes packets, and the RLC status report identifies one or more of the packets that are not successfully received by the apparatus.

7. The apparatus of any one of clauses 1 to 5, wherein the data includes packet segments, and the RLC status report identifies one or more of the packet segments that are not successfully received by the apparatus.

8. The apparatus of any one of clauses 1 to 7, wherein the instructions cause the apparatus to transmit the RLC status report on a logical channel via the second communication link.

9. The apparatus of any one of clauses 1 to 8, wherein the first communication link is a new radio (NR) link and the second communication link is a long-term evolution (LTE) link.

10. An apparatus for wireless communication, comprising:
    a processor;
    a memory coupled with the processor; and
    instructions stored in the memory and executable by the processor to cause the apparatus to:
       receive, from a user equipment (UE), a radio link control (RLC) status report, wherein the RLC status report indicates a status of data transmitted by a base station to the UE via a first communication link, and the RLC status report is received via a second communication link; and
forward, to the base station, the RLC status report via a backhaul link.

11. The apparatus of clause 10, wherein the instructions cause the apparatus to receive the RLC status report on a logical channel via the second communication link.

12. The apparatus of clause 10 or 11, wherein the base station is configured as a secondary cell group (SCG) and the apparatus is configured as a master cell group (MCG).

13. The apparatus of any one of clauses 10 to 12, wherein the first communication link is a new radio (NR) link and the second communication link is a long-term evolution (LTE) link.

14. The apparatus of any one of clauses 10 to 13, wherein the data includes packets, and the RLC status report identifies one or more of the packets that are not successfully received by the UE.

15. The apparatus of any one of clauses 10 to 13, wherein the data includes packet segments, and the RLC status report identifies one or more of the packet segments that are not successfully received by the UE.

16. An apparatus for wireless communication, comprising:
a processor;
a memory coupled with the processor; and
instructions stored in the memory and executable by the processor to cause the apparatus to:
transmit, to a user equipment (UE), data via a communication link,
receive, from a base station, a radio link control (RLC) status report via a backhaul link, wherein the RLC status report indicates a status of the data at the UE;
determine a portion of the data that was not successfully received by the UE based on the RLC status report; and
retransmit, to the UE, the portion of the data via the communication link.

17. The apparatus of clause 16, wherein the apparatus is configured as a secondary cell group (SCG) and the base station is configured as a master cell group (MCG).

18. The apparatus of clause 16 or 17, wherein the communication link is a new radio (NR).

19. The apparatus of any one of clauses 16 to 18, wherein the data includes packets, the RLC status report identifies one or more of the packets that are not successfully received by the UE, and the portion of the data includes the one or more of the packets.

20. The apparatus of any one of clauses 16 to 18, wherein the data includes packet segments, the RLC status report identifies one or more of the packet segments that are not successfully received by the UE, and the portion of the data includes the one or more of the packet segments.

21. An apparatus for wireless communication, comprising:
a processor;
a memory coupled with the processor; and
instructions stored in the memory and executable by the processor to cause the apparatus to:
attempt to receive, from a first base station, data via a first communication link;
generate a radio link control (RLC) status report indicating a status of the data at the apparatus;
determine a size of the RLC status report;
compare the size of the RLC status report with a threshold;
if the size of the RLC status report is greater than the threshold, then transmit, to a second base station, the RLC status report via a second communication link; and
if the size of the RLC status report is less than the threshold, then transmit, to the first base station, the RLC status report via the first communication link.

22. The apparatus of clause 21, wherein the first base station is configured as a secondary cell group (SCG) and the second base station is configured as a master cell group (MCG).

23. The apparatus of clause 21 or 22, wherein the data includes packets, and the RLC status report identifies one or more of the packets that are not successfully received by the apparatus.

24. The apparatus of clause 21 or 22, wherein the data includes packet segments, and the RLC status report identifies one or more of the packet segments that are not successfully received by the apparatus.

25. The apparatus of any one of clauses 21 to 24, wherein the first communication link is a new radio (NR) link and the second communication link is a long-term evolution (LTE) link.

26. The apparatus of any one of clauses 21 to 25, wherein the instructions cause the apparatus to:
receive, from the first base station or the second base station, an instruction indicating a value for the threshold; and
set the threshold based on the value.

27. An apparatus for wireless communication, comprising:
a processor;
a memory coupled with the processor; and
instructions stored in the memory and executable by the processor to cause the apparatus to:
attempt to receive, from a base station, data via a communication link;
determine a size of a radio link control (RLC) status report in a first format, the RLC status report indicating a status of the data at the apparatus;
compare the size of the RLC status report in with a threshold;
if the size of the RLC status report in the first format is less than the threshold, then transmit the RLC status report in the first format; and
if the size of the RLC status report in the first format is greater than the threshold, then transmit the RLC status report in a second format.

28. The apparatus of clause 27, wherein a size of the RLC status report in the second format is less than the size of the RLC status report in the first format.

29. The apparatus of clause 27 or 28, wherein:
in the first format, the RLC status report identifies individual packet segments in the data that are not successfully received by the apparatus; and
in the second format, the RLC status report does not identify individual packet segments in the data that are not successfully received by the apparatus.

30. The apparatus of any one of clauses 27 to 29, wherein the communication link is a new radio (NR) link.

31. The apparatus of any one of clauses 27 to 30, wherein the instructions cause the apparatus to:
receive, from the base station or another base station, an instruction indicating a value for the threshold; and
set the threshold based on the value.

32. A method for wireless communication at a user equipment (UE), comprising:
attempting to receive, from a first base station, data via a first communication link;
generating a radio link control (RLC) status report indicating a status of the data at the UE; and
transmitting, to a second base station, the RLC status report via a second communication link.

33. The method of clause 32, wherein:
attempting to receive the data via the first communication link comprises attempting to receive the data via the first communication link in a first frequency band; and
transmitting the RLC status report via the second communication link comprises transmitting the RLC status report via the second communication link in a second frequency band.

34. The method of clause 33, wherein the first frequency band is higher than the second frequency band.

35. The method of clause 34, wherein the first frequency band is above 24 GHz, and the second frequency band is below 6 GHz.

36. The method of any one of clauses 32 to 35, wherein the first base station is configured as a secondary cell group (SCG) and the second base station is configured as a master cell group (MCG).

37. The method of any one of clauses 32 to 36, wherein the data includes packets, and the RLC status report identifies one or more of the packets that are not successfully received by the UE.

38. The method of any one of clauses 32 to 36, wherein the data includes packet segments, and the RLC status report identifies one or more of the packet segments that are not successfully received by the UE.

39. The method of any one of clauses 32 to 38, wherein transmitting the RLC status report comprises transmitting the RLC status report on a logical channel via the second communication link.

40. The method of any one of clauses 32 to 39, wherein the first communication link is a new radio (NR) link and the second communication link is a long-term evolution (LTE) link.

41. A method for wireless communication at a first base station, comprising:
receiving, from a user equipment (UE), a radio link control (RLC) status report, wherein the RLC status report indicates a status of data transmitted by a second base station to the UE via a first communication link, and the RLC status report is received via a second communication link; and
forwarding, to the second base station, the RLC status report via a backhaul link.

42. The method of clause 41, wherein receiving the RLC status report comprises receiving the RLC status report on a logical channel via the second communication link.

43. The method of clause 41 or 42, wherein the first base station is configured as a master cell group (MCG) and the second base station is configured as a secondary cell group (SCG).

44. The method of any one of clauses 41 to 43, wherein the first communication link is a new radio (NR) link and the second communication link is a long-term evolution (LTE) link.

45. The method of any one of clauses 41 to 44, wherein the data includes packets, and the RLC status report identifies one or more of the packets that are not successfully received by the UE.

46. The method of any one of clauses 41 to 44, wherein the data includes packet segments, and the RLC status report identifies one or more of the packet segments that are not successfully received by the UE.

47. A method for wireless communication at a first base station, comprising:
transmitting, to a user equipment (UE), data via a communication link,
receiving, from a second base station, a radio link control (RLC) status report via a backhaul link, wherein the RLC status report indicates a status of the data at the UE;
determining a portion of the data that was not successfully received by the UE based on the RLC status report; and
retransmitting, to the UE, the portion of the data via the communication link.

48. The method of clause 47, wherein the first base station is configured as a secondary cell group (SCG) and the second base station is configured as a master cell group (MCG).

49. The method of clause 47 or 48, wherein the communication link is a new radio (NR).

50. The method of any one of clauses 47 to 49, wherein the data includes packets, the RLC status report identifies one or more of the packets that are not successfully received by the UE, and the portion of the data includes the one or more of the packets.

51. The method of any one of clauses 47 to 49, wherein the data includes packet segments, the RLC status report identifies one or more of the packet segments that are not successfully received by the UE, and the portion of the data includes the one or more of the packet segments.

52. A method for wireless communication at a user equipment (UE), comprising:
attempting to receive, from a first base station, data via a first communication link;
generating a radio link control (RLC) status report indicating a status of the data at the UE;
determining a size of the RLC status report;
comparing the size of the RLC status report with a threshold;
if the size of the RLC status report is greater than the threshold, then transmitting, to a second base station, the RLC status report via a second communication link; and
if the size of the RLC status report is less than the threshold, then transmitting, to the first base station, the RLC status report via the first communication link.

53. The method of clause 52, wherein the first base station is configured as a secondary cell group (SCG) and the second base station is configured as a master cell group (MCG).

54. The method of clause 52 or 53, wherein the data includes packets, and the RLC status report identifies one or more of the packets that are not successfully received by the UE.

55. The method of clause 52 or 53, wherein the data includes packet segments, and the RLC status report identifies one or more of the packet segments that are not successfully received by the UE.

56. The method of any one of clauses 52 to 55, wherein the first communication link is a new radio (NR) link and the second communication link is a long-term evolution (LTE) link.

57. The method of any one of clauses 52 to 56, further comprising:
  receiving, from the first base station or the second base station, an instruction indicating a value for the threshold; and
  setting the threshold based on the value.

58. A method for wireless communication at a user equipment (UE), comprising:
  attempting to receive, from a base station, data via a communication link;
  determining a size of a radio link control (RLC) status report in a first format, the RLC status report indicating a status of the data at the UE;
  comparing the size of the RLC status report with a threshold;
  if the size of the RLC status report in the first format is less than the threshold, then transmitting the RLC status report in the first format; and
  if the size of the RLC status report in the first format is greater than the threshold, then transmitting the RLC status report in a second format.

59. The method of clause 58, wherein a size of the RLC status report in the second format is less than the size of the RLC status report in the first format.

60. The method of clause 58 or 59, wherein:
  in the first format, the RLC status report identifies individual packet segments in the data that are not successfully received by the UE; and
  in the second format, the RLC status report does not identify individual packet segments in the data that are not successfully received by the UE.

61. The method of any one of clauses 58 to 60, wherein the communication link is a new radio (NR) link.

62. The method of any one of clauses 58 to 61, further comprising:
  receiving, from the base station, an instruction indicating a value for the threshold; and
  setting the threshold based on the value.

63. An apparatus for wireless communication, comprising:
  means for attempting to receive, from a first base station, data via a first communication link;
  means for generating a radio link control (RLC) status report indicating a status of the data at the apparatus; and
  means for transmitting, to a second base station, the RLC status report via a second communication link.

64. The apparatus of clause 63, wherein:
  the means for attempting to receive the data via the first communication link comprises means for attempting to receive the data via the first communication link in a first frequency band; and
  the means for transmitting the RLC status report via the second communication link comprises means for transmitting the RLC status report via the second communication link in a second frequency band.

65. The apparatus of clause 64, wherein the first frequency band is higher than the second frequency band.

66. The apparatus of clause 65, wherein the first frequency band is above 24 GHz, and the second frequency band is below 6 GHz.

67. The apparatus of any one of clauses 63 to 66, wherein the first base station is configured as a secondary cell group (SCG) and the second base station is configured as a master cell group (MCG).

68. The apparatus of any one of clauses 63 to 67, wherein the data includes packets, and the RLC status report identifies one or more of the packets that are not successfully received by the apparatus.

69. The apparatus of any one of clauses 63 to 67, wherein the data includes packet segments, and the RLC status report identifies one or more of the packet segments that are not successfully received by the apparatus.

70. The apparatus of any one of clauses 63 to 69, wherein the means for transmitting the RLC status report comprises means for transmitting the RLC status report on a logical channel via the second communication link.

71. The apparatus of any one of clauses 63 to 70, wherein the first communication link is a new radio (NR) link and the second communication link is a long-term evolution (LTE) link.

72. An apparatus for wireless communication, comprising:
  means for receiving, from a user equipment (UE), a radio link control (RLC) status report, wherein the RLC status report indicates a status of data transmitted by a base station to the UE via a first communication link, and the RLC status report is received via a second communication link; and
  means for forwarding, to the base station, the RLC status report via a backhaul link.

73. The apparatus of clause 72, wherein the means for receiving the RLC status report comprises means for receiving the RLC status report on a logical channel via the second communication link.

74. The apparatus of clause 72 or 73, wherein the apparatus is configured as a master cell group (MCG) and the base station is configured as a secondary cell group (SCG).

75. The apparatus of any one of clauses 72 to 74, wherein the first communication link is a new radio (NR) link and the second communication link is a long-term evolution (LTE) link.

76. The apparatus of any one of clauses 72 to 75, wherein the data includes packets, and the RLC status report identifies one or more of the packets that are not successfully received by the UE.

77. The apparatus of any one of clauses 72 to 75, wherein the data includes packet segments, and the RLC status report identifies one or more of the packet segments that are not successfully received by the UE.

78. An apparatus for wireless communication, comprising:
  means for transmitting, to a user equipment (UE), data via a communication link,
  means for receiving, from a base station, a radio link control (RLC) status report via a backhaul link, wherein the RLC status report indicates a status of the data at the UE;
  means for determining a portion of the data that was not successfully received by the UE based on the RLC status report; and
  means for retransmitting, to the UE, the portion of the data via the communication link.

79. The apparatus of clause 78, wherein the apparatus is configured as a secondary cell group (SCG) and the base station is configured as a master cell group (MCG).

80. The apparatus of clause 78 or 79, wherein the communication link is a new radio (NR).

81. The apparatus of any one of clauses 78 to 80, wherein the data includes packets, the RLC status report identifies one or more of the packets that are not successfully received by the UE, and the portion of the data includes the one or more of the packets.

82. The apparatus of any one of clauses 78 to 80, wherein the data includes packet segments, the RLC status report identifies one or more of the packet segments that are not successfully received by the UE, and the portion of the data includes the one or more of the packet segments.

83. An apparatus for wireless communication, comprising:
means for attempting to receive, from a first base station, data via a first communication link;
means for generating a radio link control (RLC) status report indicating a status of the data at the apparatus;
means for determining a size of the RLC status report;
means for comparing the size of the RLC status report with a threshold;
means for transmitting, to a second base station, the RLC status report via a second communication link if the size of the RLC status report is greater than the threshold; and
means for transmitting, to the first base station, the RLC status report via the first communication link if the size of the RLC status report is less than the threshold.

84. The apparatus of clause 83, wherein the first base station is configured as a secondary cell group (SCG) and the second base station is configured as a master cell group (MCG).

85. The apparatus of clause 83 or 84, wherein the data includes packets, and the RLC status report identifies one or more of the packets that are not successfully received by the apparatus.

86. The apparatus of clause 83 or 84, wherein the data includes packet segments, and the RLC status report identifies one or more of the packet segments that are not successfully received by the apparatus.

87. The apparatus of any one of clauses 83 to 86, wherein the first communication link is a new radio (NR) link and the second communication link is a long-term evolution (LTE) link.

88. The apparatus of any one of clauses 83 to 87, further comprising:
means for receiving, from the first base station or the second base station, an instruction indicating a value for the threshold; and
means for setting the threshold based on the value.

89. An apparatus for wireless communication, comprising:
means for attempting to receive, from a base station, data via a communication link;
means for determining a size of a radio link control (RLC) status report in a first format, the RLC status report indicating a status of the data at the apparatus;
means for comparing the size of the RLC status report with a threshold;
means for transmitting the RLC status report in the first format if the size of the RLC status report in the first format is less than the threshold; and
means for transmitting the RLC status report in a second format if the size of the RLC status report in the first format is greater than the threshold.

90. The apparatus of clause 89, wherein a size of the RLC status report in the second format is less than the size of the RLC status report in the first format.

91. The apparatus of clause 89 or 90, wherein:
in the first format, the RLC status report identifies individual packet segments in the data that are not successfully received by the apparatus; and
in the second format, the RLC status report does not identify individual packet segments in the data that are not successfully received by the apparatus.

92. The apparatus of any one of clauses 89 to 91, wherein the communication link is a new radio (NR) link.

93. The apparatus of any one of clauses 89 to 92, further comprising:
means for receiving, from first base station, an instruction indicating a value for the threshold; and
means for setting the threshold based on the value.

94. The apparatus of clause 1, wherein an RLC entity for the first communication link is located at the first base station.

95. The apparatus of clause 10, wherein an RLC entity for the first communication link is located at the base station.

96. The apparatus of clause 16, wherein an RLC entity for the communication link is located at the apparatus.

97. The apparatus of clause 21, wherein an RLC entity for the first communication link is located at the first base station.

98. The apparatus of clause 27, wherein an RLC entity for the communication link is located at the base station.

99. A system for wireless communication including:
a first base station configured to transmit, to a user equipment (UE), data via a first communication link; and
a second base station configured to:
receive, from the UE, a radio link control (RLC) status report via a second communication link, wherein the RLC status report indicates a status of the data at the UE; and
forward, to the first base station, the RLC status report via a backhaul link;
wherein the first base station is further configured to:
determine a portion of the data that was not successfully received by the UE based on the RLC status report; and
retransmit, to the UE, the portion of the data via the first communication link.

100. The system of clause 99, wherein the second base station is configured to receive the RLC status report on a logical channel via the second communication link.

101. The system of clause 99 or 100, wherein the first base station is configured as a secondary cell group (SCG) and the second base station is configured as a master cell group (MCG).

102. The system of any one of clauses 99 to 101, wherein the first communication link is a new radio (NR) link and the second communication link is a long-term evolution (LTE) link.

103. The system of any one of clauses 99 to 102, wherein the data includes packets, and the RLC status report identifies one or more of the packets that are not successfully received by the UE.

104. The system of any one of clauses 99 to 102, wherein the data includes packet segments, and the RLC status report identifies one or more of the packet segments that are not successfully received by the UE.

Any reference to an element herein using a designation such as "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect electrical coupling between two structures. As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus for wireless communication, comprising:
a processor;
a memory coupled with the processor; and
instructions stored in the memory and executable by the processor to cause the apparatus to:
receive a threshold value;
attempt to receive, from a first base station, data via a first communication link;
generate a radio link control (RLC) status report indicating a status of the data at the apparatus;
determine that a size of the RLC status report is greater than the threshold value; and
transmit, to a second base station, the RLC status report via a second communication link.

2. The apparatus of claim 1, wherein the instructions cause the apparatus to:
attempt to receive the data via the first communication link in a first frequency band; and
transmit the RLC status report via the second communication link in a second frequency band.

3. The apparatus of claim 2, wherein the first frequency band is higher than the second frequency band.

4. The apparatus of claim 3, wherein the first frequency band is above 24 GHz, and the second frequency band is below 6 GHz.

5. The apparatus of claim 1, wherein the first base station is configured as a secondary cell group (SCG) and the second base station is configured as a master cell group (MCG).

6. The apparatus of claim 1, wherein the data includes packets, and the RLC status report identifies one or more of the packets that are not successfully received by the apparatus.

7. The apparatus of claim 1, wherein the data includes packet segments, and the RLC status report identifies one or more of the packet segments that are not successfully received by the apparatus.

8. The apparatus of claim 1, wherein the instructions cause the apparatus to transmit the RLC status report on a logical channel via the second communication link.

9. The apparatus of claim 1, wherein the first communication link is a new radio (NR) link and the second communication link is a long-term evolution (LTE) link.

10. An apparatus for wireless communication, comprising:
a processor;
a memory coupled with the processor; and
instructions stored in the memory and executable by the processor to cause the apparatus to:
transmit a threshold value to a user equipment (UE);
receive, from the user equipment (UE), a radio link control (RLC) status report, a size of the RLC status report being greater than the threshold value, wherein the RLC status report indicates a status of data transmitted by a base station to the UE via a first communication link, and the RLC status report is received via a second communication link; and
forward, to the base station, the RLC status report via a backhaul link.

11. The apparatus of claim 10, wherein the instructions cause the apparatus to receive the RLC status report on a logical channel via the second communication link.

12. The apparatus of claim 10, wherein the base station is configured as a secondary cell group (SCG) and the apparatus is configured as a master cell group (MCG).

13. The apparatus of claim 10, wherein the first communication link is a new radio (NR) link and the second communication link is a long-term evolution (LTE) link.

14. The apparatus of claim 10, wherein the data includes packets, and the RLC status report identifies one or more of the packets that are not successfully received by the UE.

15. The apparatus of claim 10, wherein the data includes packet segments, and the RLC status report identifies one or more of the packet segments that are not successfully received by the UE.

16. A method for wireless communication at a user equipment (UE), comprising:
attempting to receive, from a first base station, data via a first communication link;
generating a radio link control (RLC) status report indicating a status of the data at the UE;
receiving a threshold value;
determining a size of the RLC status report is greater than the threshold value; and
transmitting, to a second base station, the RLC status report via a second communication link.

17. The method of claim 16, wherein:
attempting to receive the data via the first communication link comprises attempting to receive the data via the first communication link in a first frequency band; and
transmitting the RLC status report via the second communication link comprises transmitting the RLC status report via the second communication link in a second frequency band.

18. The method of claim 17, wherein the first frequency band is higher than the second frequency band.

19. The method of claim 18, wherein the first frequency band is above 24 GHz, and the second frequency band is below 6 GHz.

20. The method of claim 16, wherein the first base station is configured as a secondary cell group (SCG) and the second base station is configured as a master cell group (MCG).

21. The method of claim 16, wherein the data includes packets, and the RLC status report identifies one or more of the packets that are not successfully received by the UE.

22. The method of claim 16, wherein the data includes packet segments, and the RLC status report identifies one or more of the packet segments that are not successfully received by the UE.

23. The method of claim 16, wherein transmitting the RLC status report comprises transmitting the RLC status report on a logical channel via the second communication link.

24. The method of claim 16, wherein the first communication link is a new radio (NR) link and the second communication link is a long-term evolution (LTE) link.

25. A method for wireless communication at a first base station, comprising:
   transmitting a threshold value to a user equipment (UE);
   receiving, from the user equipment (UE), a radio link control (RLC) status report, a size of the RLC status report being greater than the threshold value, wherein the RLC status report indicates a status of data transmitted by a second base station to the UE via a first communication link, and the RLC status report is received via a second communication link; and
   forwarding, to the second base station, the RLC status report via a backhaul link.

26. The method of claim 25, wherein receiving the RLC status report comprises receiving the RLC status report on a logical channel via the second communication link.

27. The method of claim 25, wherein the first base station is configured as a master cell group (MCG) and the second base station is configured as a secondary cell group (SCG).

28. The method of claim 25, wherein the first communication link is a new radio (NR) link and the second communication link is a long-term evolution (LTE) link.

29. The method of claim 25, wherein the data includes packets, and the RLC status report identifies one or more of the packets that are not successfully received by the UE.

30. The method of claim 25, wherein the data includes packet segments, and the RLC status report identifies one or more of the packet segments that are not successfully received by the UE.

31. The apparatus of claim 6, wherein the instructions cause the apparatus to:
   after the RLC status report is transmitted, attempt to receive the one or more of the packets via a retransmission of the one or more of the packets from the first base station.

32. The apparatus of claim 6, wherein the first communication link is a new radio (NR) link and the second communication link is a long-term evolution (LTE) link.

33. The apparatus of claim 7, wherein the instructions cause the apparatus to:
   after the RLC status report is transmitted, attempt to receive the one or more of the packet segments via a retransmission of the one or more of the packet segments from the first base station.

34. The apparatus of claim 7, wherein the first communication link is a new radio (NR) link and the second communication link is a long-term evolution (LTE) link.

* * * * *